United States Patent
Heim

[11] Patent Number: 5,558,011
[45] Date of Patent: Sep. 24, 1996

[54] FRUIT PARING AND CUTTING APPARATUS

[76] Inventor: Stephen J. Heim, 7305 Raintree Cir., Culver City, Calif. 90230

[21] Appl. No.: 523,390

[22] Filed: Sep. 5, 1995

[51] Int. Cl.⁶ .................................................. A23N 7/00
[52] U.S. Cl. .............................. 99/595; 99/588; 99/591; 99/593; 99/598
[58] Field of Search .............................. 99/584, 588–599

[56] References Cited

U.S. PATENT DOCUMENTS

| | | | |
|---|---|---|---|
| 242,660 | 6/1881 | Law | 99/598 |
| 292,554 | 1/1884 | Geer | 99/595 |
| 310,196 | 1/1885 | Goodell | 99/598 |
| 959,137 | 5/1910 | Hinchliffe | 99/598 |
| 1,511,137 | 10/1924 | Pichler | 99/596 |
| 1,956,492 | 4/1934 | China | 99/599 |
| 2,056,843 | 10/1936 | Erro | 99/595 |
| 2,375,489 | 5/1945 | Oskow | 99/595 |
| 2,410,683 | 11/1946 | Marquez | 99/598 |
| 3,881,406 | 5/1975 | Perez | 99/599 |
| 4,619,192 | 10/1986 | Cycyk et al. | 99/595 |
| 4,753,159 | 6/1988 | Eaton | 99/596 |
| 4,765,234 | 8/1988 | Cailliot | 99/594 |

*Primary Examiner*—Timothy F. Simone
*Attorney, Agent, or Firm*—Michael A. Painter

[57] ABSTRACT

An apparatus for paring the skin or rind from fruit and cutting segments of the rind having a defined length, width and thickness. The fruit is mounted upon a rotatable shaft which is longitudinally moveable through the incorporation of a continuous worm drive. The skin or rind of the fruit is brought into communication with a plurality of paring blades which will cut the rind to a defined width and thickness. A cylindrical member is frictionally disposed adjacent the outer skin of the fruit and is rotated about its axis by the frictional engagement between the cylindrical surface and the pared strip of fruit. One or more cutting blades are secured to and rotate about the axis of the cylinder severing the pared rind into defined lengths.

7 Claims, 1 Drawing Sheet

FRUIT PARING AND CUTTING APPARATUS

BACKGROUND OF THE INVENTION

1. Field of the Invention

The present invention generally relates to fruit and vegetable paring apparatus and, more particularly, to those apparatus which use a paring blade to remove the peel from a rotating fruit or vegetable.

2. Prior Art

The prior art discloses numerous devices which are used to peel the skin or rind from a fruit or vegetable. In a typical device disclosed by the prior art, a piece of fruit is mounted upon a rotatable shaft having a spindle or screwthread disposed about the outer surface thereof. Upon the rotation of the shaft, the attached fruit or vegetable will rotate about the axis of the shaft and be longitudinally moveable through the communication of the screwthread and the supporting, engaged block. The fruit is urged against a substantially U-shaped cutting blade which penetrates the rind or skin of the fruit and, as the fruit is rotated and moved laterally past the blade, the skin or rind of the fruit is pared from the fruit or vegetable.

The problems inherent in the devices taught by the prior art relate to the inability to control the dimensions of the pared rind. The cutting assemblies disclosed by the prior art will sever a strip of rind having a width and thickness which will vary. Most importantly, no devices disclosed by the prior art provide means for cutting the strip of pared rind into segments having predetermined lengths.

The present invention substantially resolves the inadequacies of those devices disclosed by the prior art. An item of fruit is rotated about its axis and is moved laterally past a cutting assembly. The cutting assembly includes first and second paring blades which are in parallel spaced relation to each other and penetrate the rind of the fruit to define the width of the pared rind. A third paring blade is disposed perpendicular and between the first and second blades. The third blade penetrates the rind of the fruit to a depth which is specifically determined by a cutting guide and produces a strip of rind. The cutting assembly includes a rotatable cylinder having an outer surface which is knurled or otherwise adapted to frictionally engage the surface of the pared strip of rind. At least a single cutting blade is radially secured to the cylindrical member and rotates about the axis of the cylinder at a velocity determined by the rate of rotation of the fruit. As the strip of rind is pared from the fruit, the rotating cutting blade or blades will cut the strip into segments of uniform length.

SUMMARY OF THE INVENTION

The present invention is an apparatus which is capable of paring the skin or rind from a fruit or vegetable, the pared rind being cut into a plurality of segments, each having a substantially uniform width, thickness and length. Although the present invention is capable of operating with substantially any type of fruit or vegetable having a relatively thick skin or rind, the present invention will be described in connection with its use with citrus fruit such as a lemon. The present invention is mounted upon a base having opposed supports. A first cylindrical drive shaft having a worm or screwthread disposed around the exterior thereof is suitably journeled through one of the supports, the support including a mating screwthread or spindle which will cause the drive shaft to laterally move relative to the support when it is rotated. A pronged member or fork is disposed at the end of the shaft intermediate the supports and is adapted to engage the lemon. A slidable shaft is in axial alignment with the screwthreaded drive shaft and is slidably and suitably journeled through the second support. A pronged member or fork is disposed at the end of the slidable shaft intermediate the supports and is adapted to support the lemon. When the drive shaft is rotated, the lemon will rotate about the axis of the shafts and will laterally move in a direction dependent upon the orientation of the screwthreads.

A cutting assembly is disposed adjacent the outer surface of the lemon. A pair of paring blades in parallel spaced relation to each other and perpendicular to the axis of the shaft penetrate the rind defining a strip having a width determined by the space between the blades and the pitch of the screwthreads. A third paring blade is disposed between the first and second blades and penetrates the rind substantially parallel to the surface of the lemon. As the surface of the lemon passes the first, second and third blades, a strip of rind is pared from the lemon having a defined width and thickness.

The cutting assembly includes a rotatable cylinder, the outer surface thereof being adapted to frictionally engage the surface of the pared strip of rind. At least one cutting blade is radially affixed to an end of the cylinder, the cutting blade extending radially beyond the outer surface of the cylinder. As the pared strip of rind is cut from the lemon, it will be cut into segments by the radially mounted blade or blades, the length being determined by the circumference of the cylinder and the number and spacing of radially affixed cutting blades.

It is therefore an object of the present invention to provide an improved apparatus for paring and cutting the skin or rinds of fruit or vegetables.

It is another object of the present invention to provide an apparatus for cutting the rind or skin of fruit or vegetables into segments having defined widths, thicknesses and lengths.

It is still another object of the present invention to provide an apparatus for cutting and paring fruits and vegetables which can cut the rind from fruit into selected lengths.

It is still yet another object of the present invention to provide an apparatus for cutting and paring the rind from fruit or vegetables which is simple and inexpensive to fabricate.

The novel features which are believed to be characteristic of the invention, both as to its organization and method of operation, together with further objectives and advantages thereof, will be better understood from the following description considered in connection with the accompanying drawing in which a presently preferred embodiment of the invention is illustrated by way of example. It is to be expressly understood, however, that the drawing is for the purpose of illustration and description only, and is not intended as a definition of the limits of the invention.

DESCRIPTION OF THE PRESENTLY PREFERRED EMBODIMENT

Figure 1:
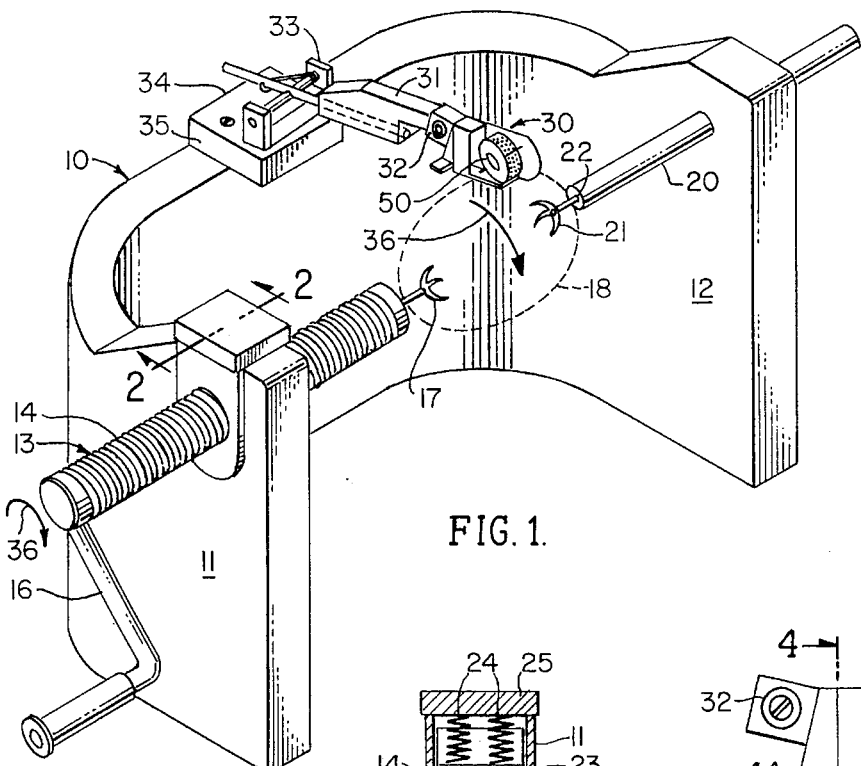
FIG. 1 is a perspective view of an apparatus for paring and cutting the rinds from fruit in accordance with the present invention.

The present invention apparatus for paring and cutting the rind of a fruit or vegetable may be best understood by reference to FIG. 1. The apparatus comprises a base 10 having opposed supports 11 and 12 which are in parallel spaced relation to each other. A cylindrical drive shaft 13 is rotatably journeled through support 11. As will be described in detail hereinbelow, a continuous screwthread 14 is disposed upon the exterior surface of shaft 13 and is engaged with threaded spindle 15 in a manner which will cause drive shaft 13 to move laterally along its axis through support 11 when handle 16 is rotated. A pronged or forked member 17 is axially mounted at the end of drive shaft 13 opposite handle 16. Fork 17 is adapted to be in communication with and secure a piece of fruit 18. Although it is understood the present invention may be used to pare and cut any type of fruit or vegetable having a rind or skin, the present invention will be discussed with reference to the paring and cutting of a lemon 18.

A sliding shaft 20 is suitably journeled through support 12 in axial alignment with drive shaft 13. Shaft 20 is rotatable about its axis and is laterally slidable within its journeled coupling to support 12. A fork or set of prongs 21 is axially secured to end 22 of sliding shaft 20 in opposition to fork 17. Lemon 18 is mounted between forks 17 and 21. When handle 16 is rotated, drive shaft 13 will rotate about its axis and laterally move through support 11 thereby laterally moving lemon 18 in a direction directed by the orientation of screwthreads 14.

Figure 2:
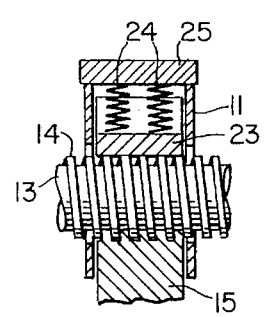
FIG. 2 is a partial cross-sectional view of the screwed shaft and support shown in FIG. 1 taken through line 2—2 of FIG. 1.

The coupling between drive shaft 13 and support 11 may be best seen in FIG. 2. It is an object of the present invention to provide means for changing drive shaft 13 in order to provide the capability to utilize drive shafts having screwthreads 14 with differing pitches. As will be described hereinbelow, a change in the pitch of screwthreads 14 will permit a change in the dimensions of the rind segments produced in accordance with the present invention. Screwthreads 14 of drive shaft 13 are seated upon spindle 15. The orifice through support 11 is greater than the diameter of screwthreads 14. To hold drive shaft 13 in place, seating head 23 is disposed adjacent screwthreads 14 in opposition to spindle 15. Helical springs 24 are disposed intermediate seating head 23 and panel 25. To change drive shaft 13, panel 25 is removed thereby relieving the force imposed by seating head 23 on drive shaft 13. Drive shaft 13 may then be laterally removed and exchanged with a different drive shaft.

It is an objective of the present invention to provide an apparatus which will pare a strip of skin or rind from lemon 18 and cut it into segments having a uniform width, thickness and length. Cutting assembly 30 is coupled to positioning arm 31 at positioning flange 32. Positioning flange 32 permits cutting assembly to be preliminarily adjusted to be placed adjacent lemon 18. Positioning arm 31 is mounted upon and aligned with positioning extender 37. Positioning extender 37 is mounted upon tension shaft 38 and is disposed perpendicular thereto. Tension shaft 38 is suitably journeled between the flanges of directional block 33, positioning extender 37 being rotatable about the axis of tension shaft 38. In order to insure that cutting assembly 30 will be maintained in contact with the lemon 18, biasing spring 39 is coupled between directional block 33 and tension shaft 38 imposing a clockwise force to positioning arm 31 and the coupled cutting assembly 30. Through the appropriate positioning of directional block 33 and positioning flange 32, cutting assembly 30 will be placed adjacent the outer surface of lemon 18 irrespective of its size or surface undulations.

The rind of lemon 18 may be pared and cut when drive shaft 13 is rotated in the direction designated by reference numeral 36. An understanding of the manner in which the fruit rind is pared and cut may be best understood by reference to FIG. 3 and FIG. 4. Cutting assembly 30 includes a pair of vertical paring blades 40 and 41 which are in parallel spaced relation to each other. A base paring blade is disposed at the lower end of each vertical paring blade 40 and 41 and is perpendicular to each. After base paring blade 42 is provided with initial entry into the outer surface of the rind of lemon 18, it will descend to a depth and cut a strip of rind 43 bounded by base paring blade 42 and cutting guide 44. The rotation of lemon 18 will cause rind 43 to pass between vertical paring blades 40 and 41 in the direction shown by reference numeral 45. The width of the strip of rind 43 will be substantially defined by the distance between vertical paring blades 40 and 41 and the pitch of screwthread 14.

Figure 3:
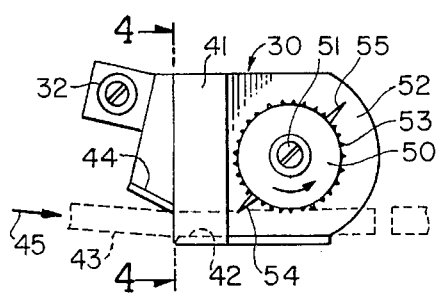
FIG. 3 is an enlarged, side elevation view of the cutting assembly shown in FIG. 1.
Figure 4:
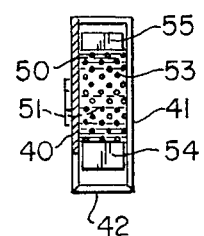
FIG. 4 is a cross-sectional view of the cutting assembly shown in FIG. 1 taken through line 4—4 of FIG. 3.

As stated hereinabove, it is an objective of the present invention to provide an apparatus which will cut segments of rind into uniform lengths. Referring to FIG. 3 and FIG. 4, a cylindrical wheel 50 is suitably journeled about shaft 51. As can be seen in FIG. 4, shaft 51 is mounted perpendicular to side wall 52 which is generally contiguous with vertical paring blade 40. A knurled or otherwise frictional member 53 is disposed about the outer cylindrical surface of wheel 50. As can be seen schematically in FIG. 3, the frictional surface 53 is adapted to be in frictional contact with the surface of the strip of rind 43. As the strip 43 is moved in the direction designated by reference numeral 45, wheel 50 will rotate counterclockwise. A pair of cutting blades 54 and 55 are radially secured to the outer cylindrical surface of wheel 50 at frictional layer 53. In the preferred embodiment of the present invention, a pair of cutting blades 54 and 55 are diametrically opposed to one another. However, it is understood the scope of the present invention encompasses the use of one or more cutting blades extending radially outwardly from the outer surface of wheel 50.

Figure 5:
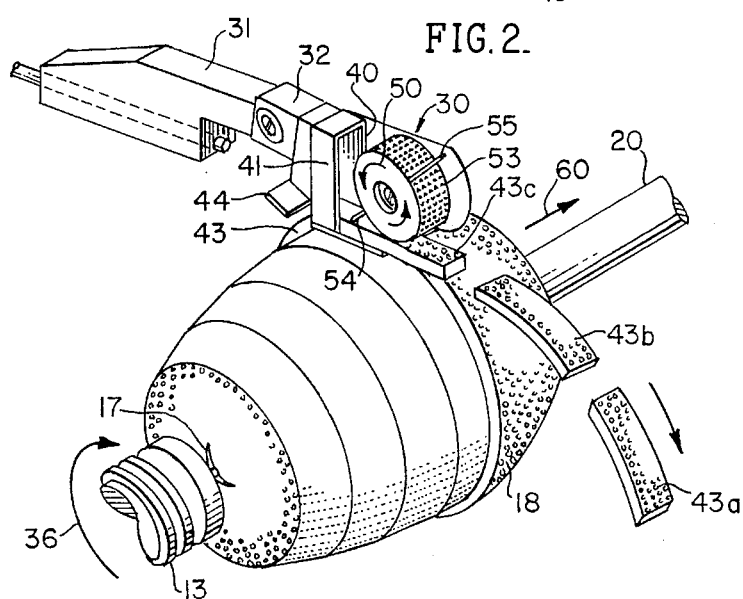
FIG. 5 schematically illustrates the rind being peeled from a lemon in accordance with the present invention.

The operation of the present invention may be best understood by reference to FIG. 5. Drive shaft 13 is being rotated in the direction designated by reference numeral 36. This will result in the rotation of lemon 18 in the same direction and the simultaneous lateral movement of drive shaft 13 and sliding shaft 20 laterally in the direction indicated by reference numeral 60. The rotational and lateral movement of lemon 18 will result in a strip of rind 43, the width and thickness of which is primarily defined by the relative spacing of cutting guide 44, vertical paring blades 40, 41 and base paring blade 42. As the strip of rind engages the frictional layer 53 on the outer surface of wheel 50, cutting blades 54 and 55 will rotate about the axis of wheel 50. Contact between cutting blades 54 and 55 with the strip of rind 43 will result in cut rind segments 43a, 43b and 43c, the length of which is dependent upon the circumferential spacing between cutting blades 54 and 55. Since the mounted fruit is moving laterally past cutting assembly 30, the operation of the present invention will continue until all usable rind has been cut from the surface of lemon 18.

I claim:

1. An apparatus for paring and cutting fruit comprising:
   (a) a base including first and second opposed vertical supports, aligned apertures being disposed through each of said first and second supports;
   (b) a screwthreaded spindle coupled within the aperture in said first support;
   (c) a cylindrical drive shaft having first and second ends and having a screwthreaded segment thereon rotatably journeled through said first support, said screwthreaded segment in engagement with said spindle;
   (d) first fruit holding means for releasably holding the fruit secured to the first end of said drive shaft;
   (e) rotation means for rotating said drive shaft and the first fruit holding means secured to the second end of said drive shaft;
   (f) a slidable shaft axially aligned with said drive shaft, said slidable shaft being rotatably journeled and slidably coupled within the aperture in said second support;
   (g) second fruit holding means for releasably holding the fruit secured to said slidable shaft in opposition to said first fruit holding means;
   (h) a cutting assembly resiliently secured to said base and positioned intermediate said first and second fruit holding means, said cutting assembly comprising first, second and third paring blades each having paring edges directed in opposition to the direction of rotation of the fruit, said first and second blades being in parallel spaced relation to each other and perpendicular to the axis of said drive shaft and slidable shaft, said third blade being coupled between said first and second blades at one end thereof and being perpendicular thereto, and a cutting guide in parallel spaced relation to the third paring blade whereby the thickness of the pared fruit is determined; and
   (i) cutting means for cutting that portion of the fruit in paring engagement with the paring blades into uniform segments.

2. An apparatus for paring and cutting fruit as defined in claim 1 wherein said rotation means comprises a manually operable handle.

3. An apparatus for paring and cutting fruit as defined in claim 1 wherein said cutting means comprises a cylindrical member rotatably journeled about an axis parallel to the third paring blade, the cylindrical surface of said cylindrical member having a frictional engaging surface disposed thereon aligned intermediate said first and second paring blades and adapted to frictionally engage the portion of the fruit in paring engagement with the first, second and third paring blade, and at least one cutting blade radially secured to said cylindrical member and extending outwardly from said frictional engagement surface.

4. An apparatus for paring and cutting fruit as defined in claim 3 wherein said cutting means comprises two cutting blades radially secured to said cylindrical member in diametrical opposition to one another.

5. An apparatus for paring and cutting fruit comprising:
   (a) a base including first and second opposed vertical supports, aligned apertures being disposed through each of said first and second supports;
   (b) a screwthreaded spindle coupled within the aperture in said first support;
   (c) a cylindrical drive shaft having first and second ends and having a screwthreaded segment thereon changeably mounted within and rotatably journeled through said first support, said screwthreaded segment in engagement with said spindle;
   (d) a slidable shaft having first and second ends in axial alignment with said drive shaft, said slidable shaft being rotatably journeled and slidably coupled within the aperture in said second support;
   (e) fruit holding members secured to each of the opposing first ends of said drive shaft and slidable shaft respectively whereby fruit may be secured between the fruit holding members;
   (f) rotation means for rotating the drive shaft secured to the second end of said drive shaft in opposition to said fruit holding members; and
   (g) a cutting assembly resiliently secured to said base and positioned intermediate said first and second fruit holding means, said cutting assembly comprising first, second and third paring blades each having paring edges directed in opposition to the direction of rotation of the fruit, said first and second blades being in parallel spaced relation to each other and perpendicular to the axis of said drive shaft and slidable shaft, said third blade being coupled between said first and second blades at one end thereof and being perpendicular thereto, and a cutting guide in parallel spaced relation to the third paring blade whereby the thickness of the pared fruit is determined; and
   (h) cutting means for cutting that portion of the fruit in paring engagement with the paring blades into uniform segments.

6. An apparatus for paring and cutting fruit as defined in claim 5 wherein said cutting means comprises a cylindrical member rotatably journeled about an axis parallel to the third paring blade, the cylindrical surface of said cylindrical member having a frictional engaging surface disposed thereon aligned intermediate said first and second paring blades and adapted to frictionally engage the portion of the fruit in paring engagement with the first, second and third paring blade, and at least one cutting blade radially secured to said cylindrical member and extending outwardly from said frictional engagement surface.

7. An apparatus for paring and cutting fruit as defined in claim 6 wherein said cutting means comprises two cutting blades radially secured to said cylindrical member in diametrical opposition to one another.

* * * * *